US012566969B2

(12) United States Patent
Li et al.

(10) Patent No.: US 12,566,969 B2
(45) Date of Patent: Mar. 3, 2026

(54) METHOD AND APPARATUS FOR TRAINING MACHINE READING COMPREHENSION MODEL, AND NON- TRANSITORY COMPUTER-READABLE RECORDING MEDIUM

(71) Applicants: Hongyu Li, Beijing (CN); Bin Dong, Beijing (CN); Shanshan Jiang, Beijing (CN); Lei Ding, Beijing (CN)

(72) Inventors: Hongyu Li, Beijing (CN); Bin Dong, Beijing (CN); Shanshan Jiang, Beijing (CN); Lei Ding, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 396 days.

(21) Appl. No.: 18/316,744

(22) Filed: May 12, 2023

(65) Prior Publication Data

US 2023/0376779 A1 Nov. 23, 2023

(30) Foreign Application Priority Data

May 19, 2022 (CN) .......................... 202210556487.6

(51) Int. Cl.
| | |
|---|---|
| *G06N 3/09* | (2023.01) |
| *G06F 40/166* | (2020.01) |
| *G06F 40/30* | (2020.01) |
| *G06F 40/40* | (2020.01) |

(52) U.S. Cl.
CPC ............. *G06N 3/09* (2023.01); *G06F 40/166* (2020.01); *G06F 40/30* (2020.01); *G06F 40/40* (2020.01)

(58) Field of Classification Search
CPC ......... G06N 3/09; G06F 40/166; G06F 40/40; G06F 40/30
See application file for complete search history.

(56) References Cited

U.S. PATENT DOCUMENTS

| | | |
|---|---|---|
| 2018/0341863 A1 | 11/2018 | Ding et al. |
| 2020/0311353 A1 | 10/2020 | Li et al. |
| 2021/0303777 A1 | 9/2021 | Tong et al. |

(Continued)

OTHER PUBLICATIONS

Zeng, Junjie, et al. "Integrate Candidate Answer Extraction with Re-Ranking for Chinese Machine Reading Comprehension." Entropy 23.3 (2021): 322. (Year: 2021).*

*Primary Examiner* — Bhavesh M Mehta
*Assistant Examiner* — Edward Tracy, Jr.
(74) *Attorney, Agent, or Firm* — IPUSA, PLLC

(57) ABSTRACT
A method and an apparatus for training a machine reading comprehension model, and a non-transitory computer-readable recording medium are provided. A training process is repeatedly performed using a training sample set to obtain a machine reading comprehension model. The training process includes inputting a sample article and a sample question into the machine reading comprehension model, generating a first predicted answer, and calculating a first loss between the first predicted answer and a sample answer; replacing the sample question with a mask to obtain a mask question, inputting the sample article and the mask question into the machine reading comprehension model, generating a second predicted answer corresponding to the mask question, and calculating a second loss between the second predicted answer and the sample answer; and updating the machine reading comprehension model so as to minimize a total loss.

12 Claims, 6 Drawing Sheets

(56)                    References Cited

U.S. PATENT DOCUMENTS

| | | | |
|---|---|---|---|
| 2021/0390454 A1 | 12/2021 | Xiao et al. | |
| 2022/0230000 A1* | 7/2022 | Jalaluddin | G06F 40/295 |
| 2022/0230061 A1* | 7/2022 | Singh | G06F 40/20 |

* cited by examiner

FIG.2

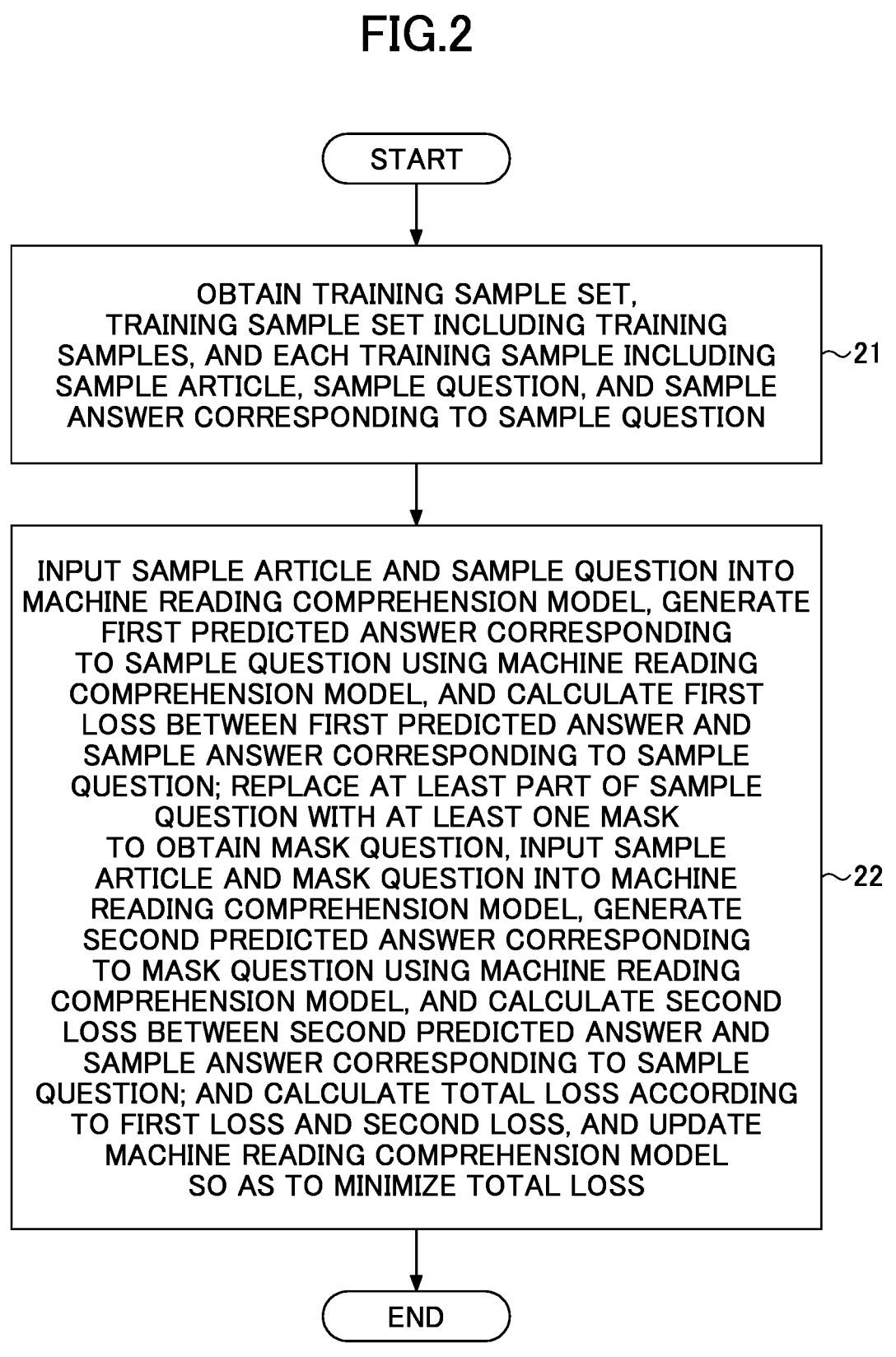

START

OBTAIN TRAINING SAMPLE SET,
TRAINING SAMPLE SET INCLUDING TRAINING
SAMPLES, AND EACH TRAINING SAMPLE INCLUDING
SAMPLE ARTICLE, SAMPLE QUESTION, AND SAMPLE
ANSWER CORRESPONDING TO SAMPLE QUESTION ~21

INPUT SAMPLE ARTICLE AND SAMPLE QUESTION INTO
MACHINE READING COMPREHENSION MODEL, GENERATE
FIRST PREDICTED ANSWER CORRESPONDING
TO SAMPLE QUESTION USING MACHINE READING
COMPREHENSION MODEL, AND CALCULATE FIRST
LOSS BETWEEN FIRST PREDICTED ANSWER AND
SAMPLE ANSWER CORRESPONDING TO SAMPLE
QUESTION; REPLACE AT LEAST PART OF SAMPLE
QUESTION WITH AT LEAST ONE MASK
TO OBTAIN MASK QUESTION, INPUT SAMPLE
ARTICLE AND MASK QUESTION INTO MACHINE ~22
READING COMPREHENSION MODEL, GENERATE
SECOND PREDICTED ANSWER CORRESPONDING
TO MASK QUESTION USING MACHINE READING
COMPREHENSION MODEL, AND CALCULATE SECOND
LOSS BETWEEN SECOND PREDICTED ANSWER AND
SAMPLE ANSWER CORRESPONDING TO SAMPLE
QUESTION; AND CALCULATE TOTAL LOSS ACCORDING
TO FIRST LOSS AND SECOND LOSS, AND UPDATE
MACHINE READING COMPREHENSION MODEL
SO AS TO MINIMIZE TOTAL LOSS

END

SAMPLE QUESTION

QUESTION CONSISTING OF 15 WORDS

What is the name of the quarterback who was 38 in Super Bowl XXXIII?

REPLACE ALL WORDS WITH MASK

FIRST MASK QUESTION

QUESTION CONSISTING OF MASK "[MASK]" AND HAVING SAME LENGTH AS SAMPLE QUESTION

[MASK][MASK][MASK]  ...  [MASK][MASK][MASK]

SAMPLE QUESTION

QUESTION CONSISTING OF 15 WORDS

What is the name of the quarterback who was 38 in Super Bowl XXXIII?

REPLACE PART OF WORDS WITH MASK

INTERROGATIVE SENTENCE

What is the name? [MASK][MASK] ... [MASK][MASK][MASK][MASK]

SECOND MASK QUESTION

QUESTION CONSISTING OF INTERROGATIVE SENTENCE AND MASK "[MASK]" AND HAVING SAME LENGTH AS SAMPLE QUESTION

FIG.5

SAMPLE OBTAINING MODULE ~601

MODEL TRAINING MODULE ~602

~700

MACHINE READING COMPREHENSION
MODEL TRAINING APPARATUS

701~ NETWORK
INTERFACE

PROCESSOR ~702

MEMORY ~704

OPERATING
SYSTEM ~7041

703~ INPUT DEVICE

APPLICATION
PROGRAM ~7042

705~ HDD

DISPLAY DEVICE ~706

METHOD AND APPARATUS FOR TRAINING MACHINE READING COMPREHENSION MODEL, AND NON- TRANSITORY COMPUTER-READABLE RECORDING MEDIUM

CROSS-REFERENCE TO RELATED APPLICATIONS

The present application claims priority under 35 U.S.C. § 119 to Chinese Application No. 202210556487.6 filed on May 19, 2022, the entire contents of which are incorporated herein by reference.

BACKGROUND OF THE INVENTION

1. Field of the Invention

The present disclosure relates to the field of machine learning and natural language processing (NLP), and specifically, a method and an apparatus for training a machine reading comprehension (MRC) model, and a non-transitory computer-readable recording medium.

2. Description of the Related Art

Machine reading comprehension is an important part of search engines and question answering systems, which can extract a matched answer with respect to a question input by a user from relevant articles. Although the performance of neural network methods on machine reading comprehension tasks has been greatly improved, the robustness of these methods is insufficient. Robustness refers to the ability to resist or overcome adverse conditions or rigorous testing. For example, as shown in FIG. 1, for a neural network-based machine reading comprehension model, an input article is "The past record was held by John Elway, who led the Broncos to victory in Super Bowl XXXIII at age 38 and . . . .", a question is "What is the name of the quarterback who was 38 in Super Bowl XXXIII?" and a correct answer to the question is "John Elway". If a bogus interference sentence "Quarterback Jeff Dean had jersey number 37 in Champ Bowl XXXIV" is added into the article, the model will be misled into outputting an incorrect answer "Jeff Dean".

The usual method to improve the robustness of machine reading comprehension in conventional technologies is to add automatically generated adversarial samples (adversarial articles) into an original data set, and to use the expanded data set with the adversarial samples to train the neural network model thereby learning an anti-interference ability. However, this method has the following disadvantages. (1) The artificially generated adversarial articles may be samples that do not conform to human language expression habits. These sentences that are unnatural to humans are equivalent to introducing noise, which will have a negative impact on model performance. (2) If a data set is replaced when training a model, it is necessary to regenerate adversarial samples. In addition, in order to obtain better anti-interference ability, an iterative method is adopted on some more advanced models. For each iteration, adversarial samples which the model is hard to deal with are generated according to the performance of the current model, the adversarial samples are added into a data set, and the current model is trained using the expanded data set in the current iteration. This method is inefficient because it requires multiple iterations of training.

SUMMARY OF THE INVENTION

According to an aspect of the present disclosure, a method for training a machine reading comprehension model is provided. The method includes obtaining a training sample set, the training sample set including a plurality of training samples, and each of the training samples including a sample article, a sample question, and a sample answer corresponding to the sample question; and repeatedly performing a training process using the training sample set until a preset training termination condition is met, so as to obtain a trained machine reading comprehension model, wherein the training process includes inputting the sample article and the sample question into the machine reading comprehension model, generating a first predicted answer corresponding to the sample question using the machine reading comprehension model, and calculating a first loss between the first predicted answer and the sample answer corresponding to the sample question; replacing at least a part of the sample question with at least one mask to obtain a mask question, inputting the sample article and the mask question into the machine reading comprehension model, generating a second predicted answer corresponding to the mask question using the machine reading comprehension model, and calculating a second loss between the second predicted answer and the sample answer corresponding to the sample question; and calculating a total loss according to the first loss and the second loss, and updating the machine reading comprehension model so as to minimize the total loss.

According to another aspect of the present disclosure, an apparatus for training a machine reading comprehension model is provided. The apparatus includes a memory storing computer-executable instructions; and one or more processors. The one or more processors are configured to execute the computer-executable instructions such that the one or more processors are configured to obtain a training sample set, the training sample set including a plurality of training samples, and each of the training samples including a sample article, a sample question, and a sample answer corresponding to the sample question; and repeatedly perform a training process using the training sample set until a preset training termination condition is met, so as to obtain a trained machine reading comprehension model, wherein the training process includes inputting the sample article and the sample question into the machine reading comprehension model, generating a first predicted answer corresponding to the sample question using the machine reading comprehension model, and calculating a first loss between the first predicted answer and the sample answer corresponding to the sample question; replacing at least a part of the sample question with at least one mask to obtain a mask question, inputting the sample article and the mask question into the machine reading comprehension model, generating a second predicted answer corresponding to the mask question using the machine reading comprehension model, and calculating a second loss between the second predicted answer and the sample answer corresponding to the sample question; and calculating a total loss according to the first loss and the second loss, and updating the machine reading comprehension model so as to minimize the total loss.

According to another aspect of the present disclosure, a non-transitory computer-readable recording medium having computer-executable instructions for execution by one or more processors is provided. The computer-executable instructions, when executed, cause the one or more processors to carry out a method for training a machine reading comprehension model. The method includes obtaining a training sample set, the training sample set including a plurality of training samples, and each of the training samples including a sample article, a sample question, and a sample answer corresponding to the sample question; and repeatedly performing a training process using the training sample set until a preset training termination condition is met, so as to obtain a trained machine reading comprehension model, wherein the training process includes inputting the sample article and the sample question into the machine reading comprehension model, generating a first predicted answer corresponding to the sample question using the machine reading comprehension model, and calculating a first loss between the first predicted answer and the sample answer corresponding to the sample question; replacing at least a part of the sample question with at least one mask to obtain a mask question, inputting the sample article and the mask question into the machine reading comprehension model, generating a second predicted answer corresponding to the mask question using the machine reading comprehension model, and calculating a second loss between the second predicted answer and the sample answer corresponding to the sample question; and calculating a total loss according to the first loss and the second loss, and updating the machine reading comprehension model so as to minimize the total loss.

BRIEF DESCRIPTION OF THE DRAWINGS

The above and other objects, features and advantages of the present disclosure will be further clarified the following detailed description of embodiments of the present disclosure in combination with the drawings.

FIG. 2 is a flowchart illustrating an example of a machine reading comprehension model training method according to an embodiment of the present disclosure.

FIG. 5 is a schematic diagram illustrating a training process in step 22 of the embodiment of the present disclosure.

DESCRIPTION OF THE EMBODIMENTS

Figure 1:
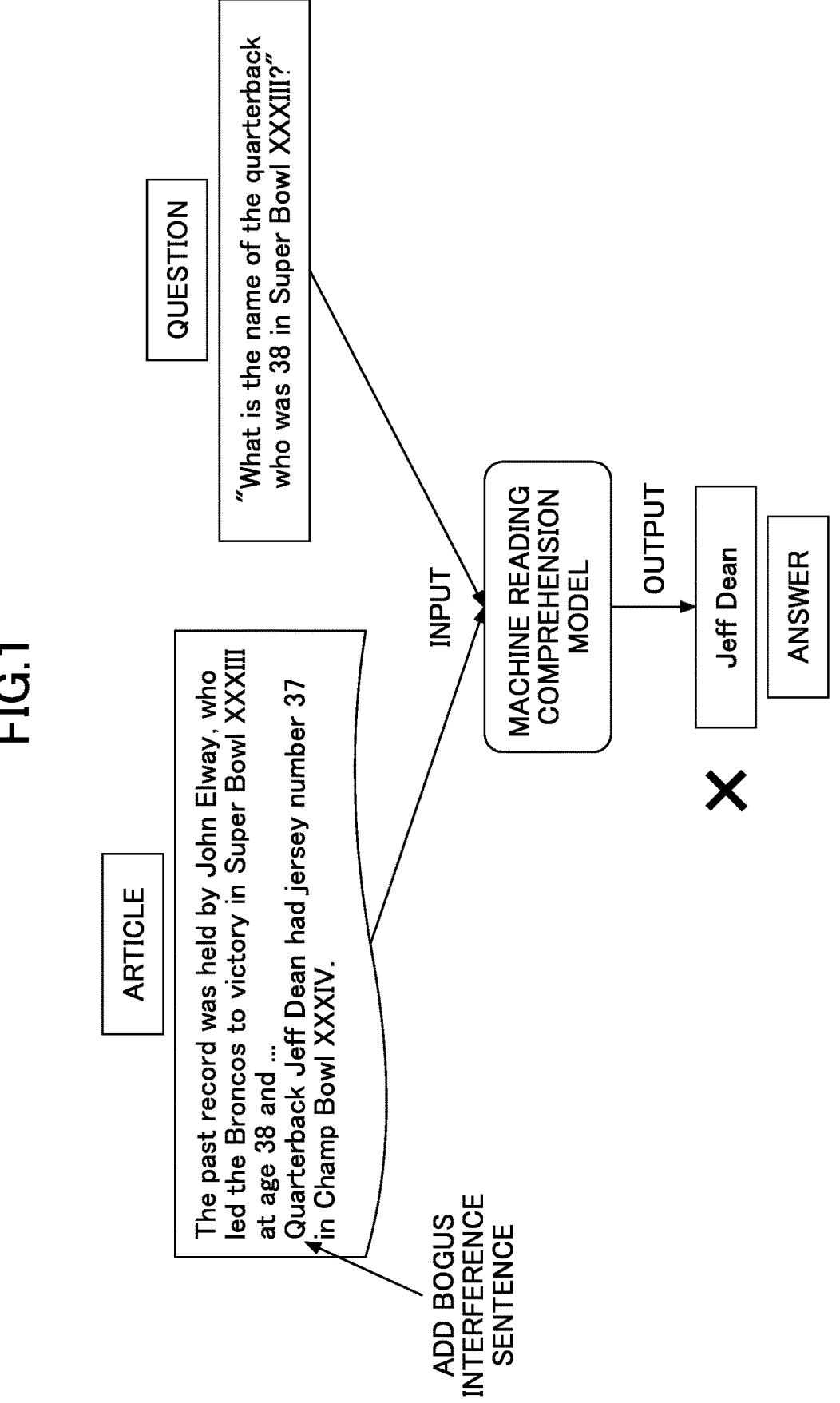
FIG. 1 is a schematic diagram illustrating a machine reading comprehension model that is misled to output a wrong answer.

In the following, specific embodiments of the present disclosure will be described in detail with reference to the accompanying drawings, so as to facilitate the understanding of technical problems to be solved by the present disclosure, technical solutions of the present disclosure, and advantages of the present disclosure. The present disclosure is not limited to the specifically described embodiments, and various modifications, combinations and replacements may be made without departing from the scope of the present disclosure. In addition, descriptions of well-known functions and constructions are omitted for clarity and conciseness.

Note that "one embodiment" or "an embodiment" mentioned in the present specification means that specific features, structures or characteristics relating to the embodiment are included in at least one embodiment of the present disclosure. Thus, "one embodiment" or "an embodiment" mentioned in the present specification may not be the same embodiment. Additionally, these specific features, structures or characteristics may be combined in any suitable manner in one or more embodiments.

Note that steps of the methods may be performed in sequential order, however the order in which the steps are performed is not limited to a sequential order. Further, the described steps may be performed in parallel or independently.

The inventors of the present disclosure found that one of the reasons why the machine reading comprehension model is misled to output wrong answers after inputting interference sentences is as follows. When training a neural network model for a machine reading comprehension task, the neural network model learns to use shortcuts to answer a question, that is, the neural network model answers the question without using any information of the question, or answers the question using only information of the interrogative sentence. Thus, the neural network model does not find the answer through all the information in the question, and then is misled to output the wrong answer, in a case where an interference sentence is added.

For example, when there is a time word such as "1980" representing the age in the interference sentence, the model may directly choose "1980" as the answer because it is asked a lot of time-related questions during training. The model learns the shortcut of "time words are more likely to be asked, so as long as there is time word in the article, use the time word as the answer" instead of reading the complete input question. For another example, when there is a name in both the interference sentence and the original article, the model only reads an interrogative word "which person" or "who" in the question, and then randomly selects the name in the interference sentence to answer the question. The model learns the shortcut of "as long as the question asks 'which person' or 'who', answer the name", and only reads the part including the interrogative word of the input question.

Thus, in order to prevent the model from being misled to output a wrong answer when adding an interference sentence, it is necessary to make the neural network model not use the shortcut to answer the question, but make full use of the information in the input question to answer the question.

The difference between the present disclosure and the conventional technologies is that the embodiments of the present disclosure makes modifications to the machine reading comprehension model (the neural network model) itself, so that it is possible to jointly train machine reading comprehension tasks for anti-interference whose input question is covered (replaced) by at least one mask, while training general machine reading comprehension tasks. In this way, it is possible to prevent the neural network model from learning shortcuts to answer only based on the interrogative words in the input question or without using information in the input question at all, thereby improving the robustness of the model.

In view of the problem of the conventional technology, an object of the embodiments of the present disclosure is to provide a method and an apparatus for training a machine reading comprehension model, and a non-transitory computer-readable recording medium, which can effectively improve the robustness of the machine reading comprehension model.

In an embodiment of the present disclosure, a machine reading comprehension model training method is provided. FIG. 2 is a flowchart illustrating an example of the machine reading comprehension model training method according to the embodiment of the present disclosure. As shown in FIG. 2, the machine reading comprehension model training method includes steps 21 to 22.

In step 21, a training sample set is obtained. The training sample set includes a plurality of training samples, and each of the training samples includes a sample article, a sample question, and a sample answer corresponding to the sample question.

Here, the training sample set stores a plurality of training samples for training the machine reading comprehension model, and each training sample includes a sample article, a sample question related to the sample article, and a sample answer corresponding to the sample question. The sample answer may specifically be a specific word range in the article, and correspondingly, a predicted answer generated by the machine reading comprehension model may also be a word range in the article. The machine reading comprehension model is a neural network-based machine reading comprehension model, and specifically, may be a machine reading comprehension model based on a series of pretrained language models (such as BERT, RoBERTa, ALBERT, etc.), or may be a model with another model structure, such as QANET, etc.

In step 22, a training process is repeatedly performed using the training sample set until a preset training termination condition is met, so as to obtain a trained machine reading comprehension model. The training process includes the following steps.

The sample article and the sample question are input into the machine reading comprehension model, a first predicted answer corresponding to the sample question is generated using the machine reading comprehension model, and a first loss between the first predicted answer and the sample answer corresponding to the sample question is calculated. Then, at least a part of the sample question is replaced with at least one mask to obtain a mask question, the sample article and the mask question are input into the machine reading comprehension model, a second predicted answer corresponding to the mask question is generated using the machine reading comprehension model, and a second loss between the second predicted answer and the sample answer corresponding to the sample question is calculated.

A total loss is calculated according to the first loss and the second loss, and the machine reading comprehension model is updated so as to minimize the total loss.

In the embodiment of the present disclosure, the model training process includes two subtasks. As the first subtask, the neural network model is trained on a general machine reading comprehension task, that is, the sample article and the sample question in the original training data set are input into the neural network model, and the first predicted answer is generated and the first loss is calculated. As the second subtask, adversarial training is performed on the machine reading comprehension task whose input question is masked, that is, the sample article and the mask question are input into the neural network model, a second predicted answer is generated and a second loss is calculated. Then, one or more model parameters of the neural network model are optimized by minimizing the total loss calculated by the two subtasks, thereby updating the machine reading comprehension model.

The training purpose of the first subtask is to let the model learn how to answer questions correctly. The training purpose of the second subtask is to prevent the model from learning shortcuts without using the input question information at all or using only part of the information in the input question (such as interrogative words) to answer question. By jointly training the two subtasks, it is ensured that the model does not affect the effect of the first subtask while achieving the purpose of the second subtask, so that the trained model has anti-interference ability and the robustness of the machine reading comprehension model can be improved.

In the embodiment of the present disclosure, it is unnecessary to generate adversarial samples during the training process. In the embodiment of the present disclosure, by modifying the machine reading comprehension model (neural network model) itself, it is possible to jointly train machine reading comprehension tasks for anti-interference whose input question is covered by at least one mask, while training general machine reading comprehension tasks. Since it is unnecessary to generate the adversarial samples, it is possible to avoid the adverse effects of introducing noise on the model. In addition, in the embodiment of the present disclosure, it is unnecessary to expand the training set based on the generated adversarial samples and perform multiple times of iterations of training during the training process, thereby improving the training efficiency of the model.

In addition, there is no strict execution order requirement between the above two subtasks. The first subtask may be executed first and then the second subtask is executed, or the second subtask may be executed first and then the first subtask is executed, or the first subtask and the second subtask may be simultaneously executed. The present disclosure is not specifically limited to these examples.

In above step 22, in the embodiment of the present disclosure, the mask question may be obtained in at least one of the following methods.

First method: replace all words of the sample question with the mask to obtain a first mask question.

Figure 3:
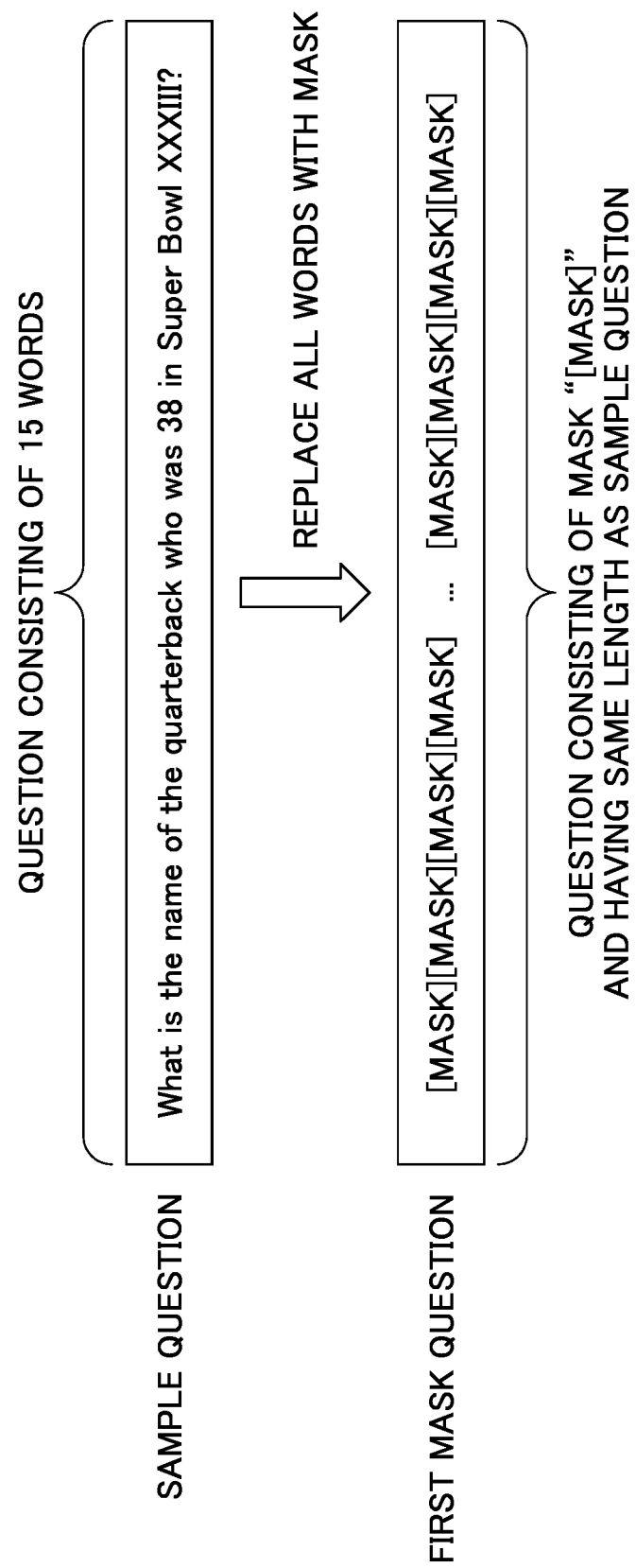
FIG. 3 is a schematic diagram illustrating a generating process of a first mask question in the embodiment of the present disclosure.

In the first mask question obtained in the first method, since all of the words in the sample question are covered by the mask, only the mask exists. FIG. 3 is a schematic diagram illustrating a generating process of a first mask question in the embodiment of the present disclosure. As shown in FIG. 3, the first mask question in which all words are covered by the mask is generated based on the sample question using the first method. The obtained first mask question is a question consisting of mask and having same length as sample question.

Second method: replace a part of the words of the sample question with the mask to obtain a second mask question.

In the second mask question obtained in the second method, a part of the words in the sample question are covered by the mask, and the remaining part of the words are still reserved. Specifically, in this embodiment of the present disclosure, all words except a preset interrogative sentence in the sample question may be replaced with the mask to obtain the second mask question.

Figure 4:
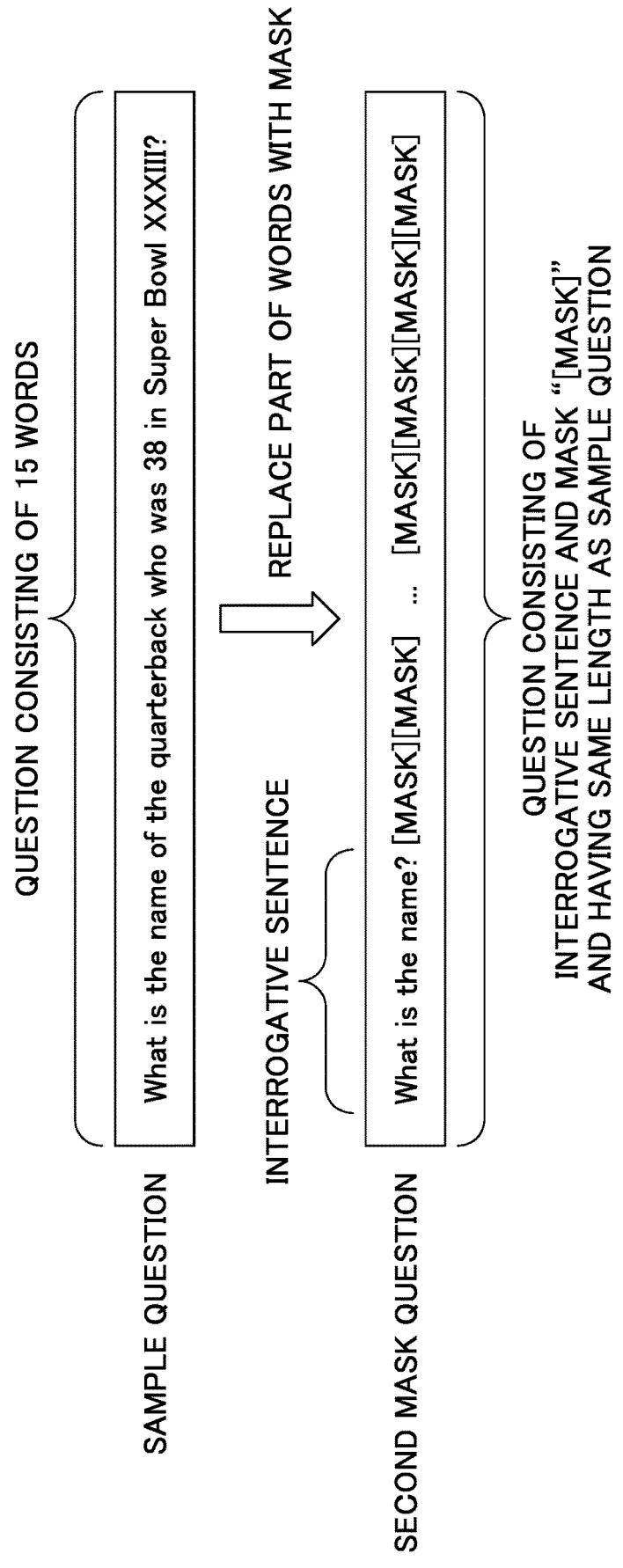
FIG. 4 is a schematic diagram illustrating a generating process of a second mask question in the embodiment of the present disclosure.

For example, in the embodiment of the present disclosure, an interrogative word library for storing interrogative words may be pre-set. When generating the second mask question, matching between the sample question and the interrogative word library is performed to determine the interrogative word and cover the sample question with the mask. FIG. 4 is a schematic diagram illustrating a generating process of a second mask question in the embodiment of the present disclosure. As shown in FIG. 4, the second mask question in which a part of the words are covered by the mask is generated based on the sample question using the second method. The obtained second mask question is a question consisting of the interrogative sentence and the mask and having same length as sample question.

In the embodiment of the present disclosure, the total loss is calculated according to the first loss and the second loss, and the parameters of the machine reading comprehension model are optimized by minimizing the total loss to update the machine reading comprehension model. Here, the total loss is positively correlated with the first loss, and the total loss is negatively correlated with the second loss.

Here, the positive correlation between the total loss and the first loss means that when the second loss remains unchanged, the total loss increases with the increase of the first loss, or the total loss decreases with the decrease of the first loss. Similarly, the negative correlation between the total loss and the second loss means that when the first loss remains unchanged, the total loss decreases with the increase of the second loss, or the total loss increases with the decrease of the second loss.

That is to say, in the embodiment of the present disclosure, during the model training process, the goal is to decrease the first loss and increase the second loss, and finally minimize the total loss. It is possible to improve the accuracy of model prediction by decreasing the first loss, and it is possible to prevent the model from using shortcuts to predict the answer by increasing the second loss.

In the embodiment of the present disclosure, the total loss may be calculated using a first formula.

(1) In a case where the mask question includes the first mask question, the first formula is as follows.

$$loss=\alpha_1\cdot loss_1-\beta_1\cdot loss_{2,1}$$

In the above formula, loss represents the total loss, $loss_1$ represents the first loss, $loss_{2,1}$ represents the second loss between the second predicted answer corresponding to the first mask question and the sample answer, and $\alpha_1$ and $\beta_1$ represent preset weights, respectively, and are positive values. As an optional implementation manner, $\alpha_1$ may be greater than $\beta_1$.

(2) In a case where the mask question includes the second mask question, the first formula is as follows.

$$loss=\alpha_2\cdot loss_1-\beta_2\cdot loss_{2,2}$$

In the above formula, $loss_1$ represents the first loss, $loss_{2,2}$ represents the second loss between the second predicted answer corresponding to the second mask question and the sample answer, and $\alpha_2$ and $\beta_2$ represent preset weights, respectively, and are positive values. As an optional implementation manner, $\alpha_2$ may be greater than $\beta_2$.

(3) In a case where the mask question includes the first mask question and the second mask question, the first formula is as follows.

$$loss=\alpha_3\cdot loss_1-\beta_3\cdot loss_{2,1}-\beta_4\cdot loss_{2,2}$$

In the above formula, $loss_1$ represents the first loss, $loss_{2,1}$ represents the second loss between the second predicted answer corresponding to the first mask question and the sample answer, $loss_{2,2}$ represents the second loss between the second predicted answer corresponding to the second mask question and the sample answer, and $\alpha_3$, $\beta_3$ and $\beta_4$ represent preset weights, respectively, and are positive values. As an optional implementation manner, $\alpha_3$ may be greater than $\beta_3$, and $\alpha_3$ may be greater than $\beta_4$.

Note that the specific values of the above preset weights $\alpha_2$, $\beta_2$, $\alpha_3$, $\beta_3$ and $\beta_4$ may be values set based on experience. Alternatively, the machine reading comprehension model may be trained separately based on different weight values, and the optimal weight value may be selected according to the prediction accuracy and anti-interference ability of the trained model. The embodiments of the present disclosure are not specifically limited to these examples.

Figure 5:
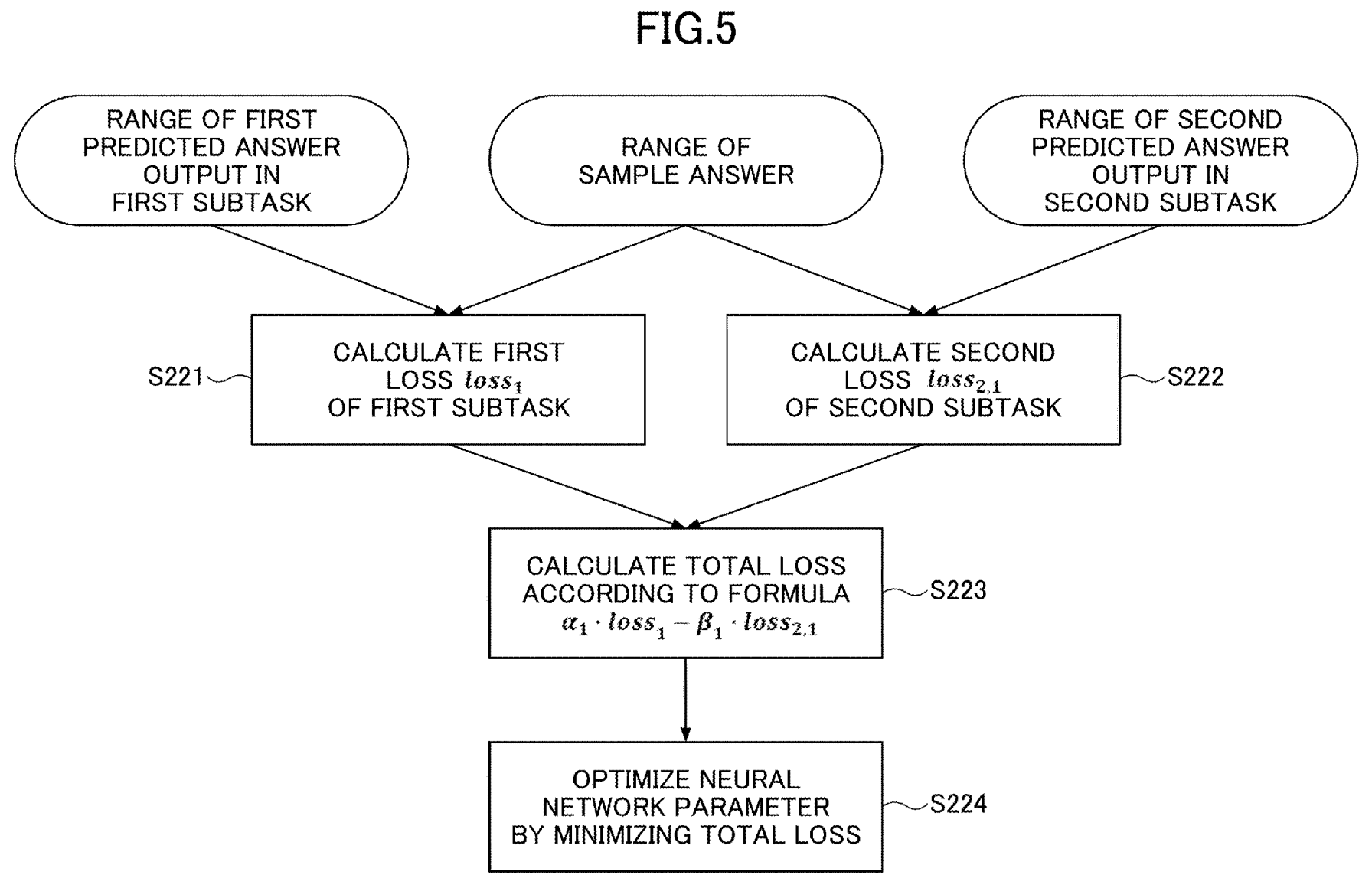

FIG. 5 is a schematic diagram illustrating a training process in step 22 of the embodiment of the present disclosure. Step 22 may include following steps.

In the first subtask, the range of the first predicted answer in the sample article is obtained. In step S221, the first loss $loss_1$ of the first subtask may be calculated according to the range of the first predicted answer in the sample article and the range of the sample answer in the sample article.

In the second subtask, the range of the second predicted answer in the sample article is obtained. In step S222, the second predicted answer of the second subtask may be calculated according to the range of the second predicted answer in the sample article and the range of the sample answer in the sample article. Here, in an example of above first mask question, the second loss is expressed as $loss_{2,1}$. Note that there is no strict execution sequence requirement for steps S221 and S222, those two steps may be executed at the same time, or one of them may be executed first and the other may be executed later.

In step S223, the total loss may be calculated according to the first loss and the second loss, for example, may be calculated according to $\alpha_1\cdot loss_1-\beta_1\cdot loss_{2,1}$. Then, in step S224, the parameters of the neural network of the machine reading comprehension model are optimized by minimizing the total loss, thereby updating the machine reading comprehension model.

A trained machine reading comprehension model is obtained by performing multiple times of training processes based on the training samples until the preset training termination condition is met. Here, the training termination condition may be a condition that the first loss has met a convergence condition, a condition that a predetermined number of training processes have been performed, or a condition that the total loss has met a convergence condition, etc. The embodiments of the present disclosure are not specifically limited to these examples.

In the embodiments of the present disclosure, after the machine reading comprehension model is obtained by training, an answer with respect to an input article and an input question may be predicted using the trained machine reading comprehension model. For example, an article and a question are input into the model, and the model outputs the range of the predicted answer in the article.

Compared with the conventional technology, by the method and the apparatus for training the machine reading comprehension model, and the non-transitory computer-readable recording medium, according to the embodiments of the present disclosure, it is possible to provide a machine reading comprehension method with an anti-interference ability, which can improve the anti-interference ability of the model by preventing the model from using shortcuts to answer questions, and can improve the robustness of the machine reading comprehension model.

Figure 6:
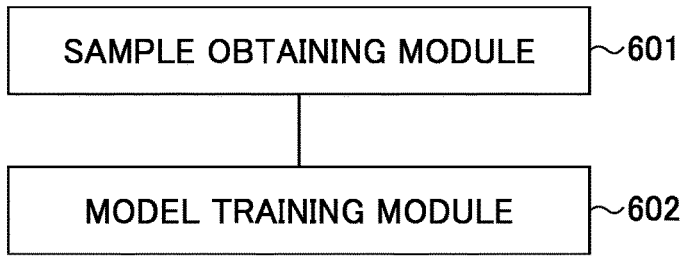
FIG. 6 is a block diagram illustrating an example of a configuration of a machine reading comprehension model training apparatus according to another embodiment of the present disclosure.

In another embodiment of the present disclosure, a machine reading comprehension model training apparatus is further provided. FIG. 6 is a block diagram illustrating an example of a configuration of the machine reading comprehension model training apparatus according to another embodiment of the present disclosure. As shown in FIG. 6, the machine reading comprehension model training apparatus includes a sample obtaining module 601 and a model training module 602.

The sample obtaining module 601 obtains a training sample set. The training sample set includes a plurality of training samples, and each of the training samples includes a sample article, a sample question, and a sample answer corresponding to the sample question. The model training module 602 repeatedly performs a training process using the training sample set until a preset training termination condition is met, so as to obtain a trained machine reading comprehension model. The training process includes inputting the sample article and the sample question into the machine reading comprehension model, generating a first predicted answer corresponding to the sample question using the machine reading comprehension model, and calculating a first loss between the first predicted answer and the sample answer corresponding to the sample question; replacing at least a part of the sample question with at least one mask to obtain a mask question, inputting the sample article and the mask question into the machine reading comprehension model, generating a second predicted answer corresponding to the mask question using the machine reading comprehension model, and calculating a second loss between the second predicted answer and the sample answer corresponding to the sample question; and calculating a total loss according to the first loss and the second loss, and updating the machine reading comprehension model so as to minimize the total loss.

In the embodiments of the present disclosure, by the above machine reading comprehension model training apparatus, it is possible to improve the anti-interference ability and robustness of the trained machine reading comprehension model.

Preferably, the model training module 602 includes at least one of a first generating module and a second generating module. The first generating module replaces all words of the sample question with the mask to obtain a first mask question. The second generating module replaces a part of the words of the sample question with the mask to obtain a second mask question.

Preferably, the second generating module replaces all words except a preset interrogative sentence in the sample question with the mask to obtain the second mask question. The second generating module is further configured to use a mask to cover all words in the sample question except the preset interrogative words to obtain a second mask question.

Preferably, the total loss is positively correlated with the first loss, and the total loss is negatively correlated with the second loss.

Preferably, the model training module 602 includes a first calculation module. The first calculation module calculate the total loss using a first formula. The first formula is $loss = \alpha_1 \cdot loss_1 - \beta_1 \cdot loss_{2,1}$, in a case where the mask question includes the first mask question. The first formula is $loss = \alpha_2 \cdot loss_1 - \beta_2 \cdot loss_{2,2}$, in a case where the mask question includes the second mask question. The first formula is $loss = \alpha_3 \cdot loss_1 - \beta_3 \cdot loss_{2,1} - \beta_4 \cdot loss_{2,2}$, in a case where the mask question includes the first mask question and the second mask question. Here, loss represents the total loss, $loss_1$ represents the first loss, $loss_{2,1}$ represents the second loss between the second predicted answer corresponding to the first mask question and the sample answer, $loss_{2,2}$ represents the second loss between the second predicted answer corresponding to the second mask question and the sample answer, and $\alpha_1$, $\beta_1$, $\alpha_2$, $\beta_2$, $\alpha_3$, $\beta_3$ and $\beta_4$ represent preset weights, respectively, and are positive values. Preferably, $\alpha_1$ is greater than $\beta_1$, $\alpha_2$ is greater than $\beta_2$, $\alpha_3$ is greater than $\beta_3$, and $\alpha_3$ is greater than $\beta_4$.

Preferably, the machine reading comprehension model training apparatus further includes a prediction module. The prediction module predicts an answer with respect to an input article and an input question using the trained machine reading comprehension model.

Figure 7:
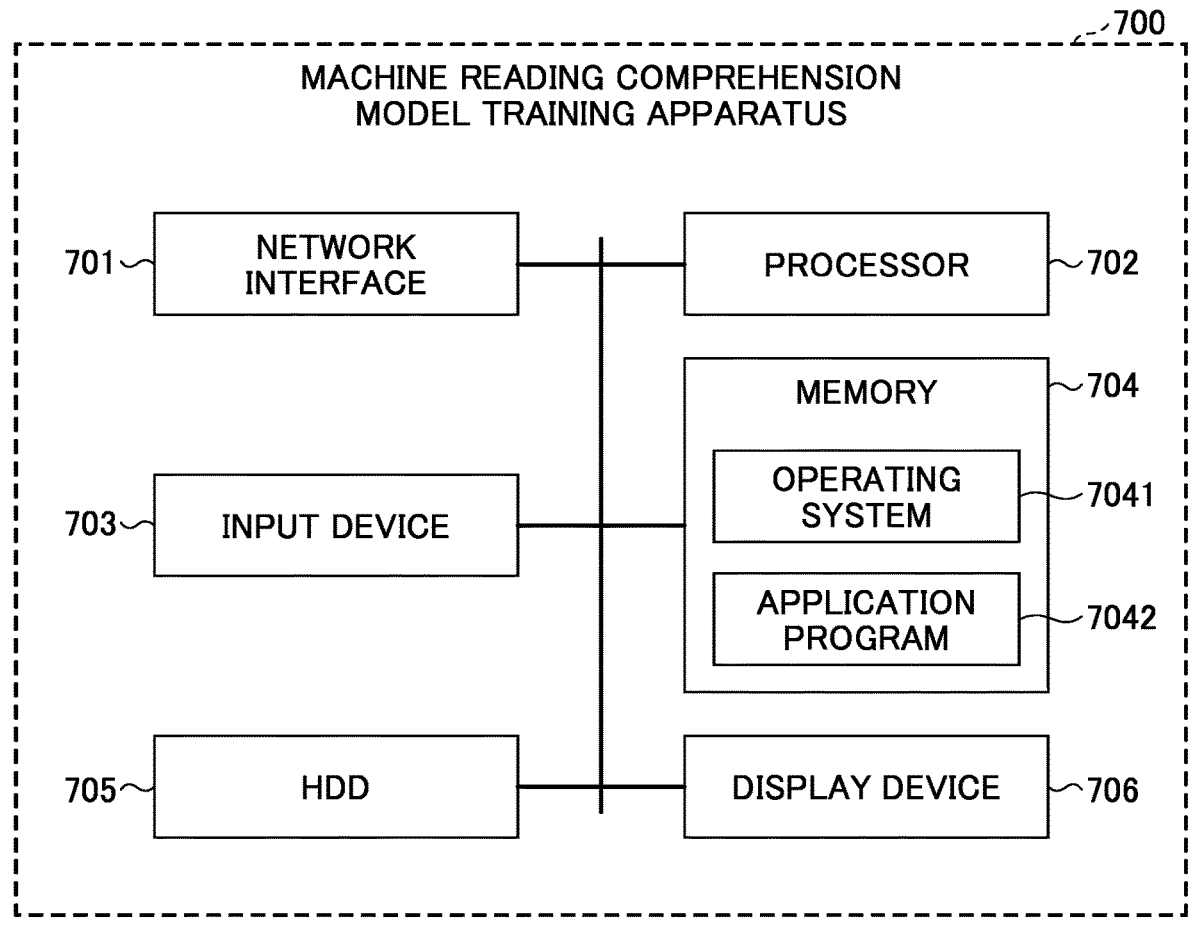
FIG. 7 is a block diagram illustrating another example of the configuration of the machine reading comprehension model training apparatus according to the embodiment of the present disclosure.

FIG. 7 is a block diagram illustrating another example of the configuration of the machine reading comprehension model training apparatus according to the embodiment of the present disclosure. As shown in FIG. 7, the machine reading comprehension model training apparatus 700 includes a processor 702, and a memory 704 storing computer-executable instructions.

When the computer-executable instructions are executed by the processor 702, the processor 702 are configured to perform the following steps. A training sample set is obtained. The training sample set includes a plurality of training samples, and each of the training samples includes a sample article, a sample question, and a sample answer corresponding to the sample question. Then, a training process is repeatedly performed using the training sample set until a preset training termination condition is met, so as to obtain a trained machine reading comprehension model. The training process includes inputting the sample article and the sample question into the machine reading comprehension model, generating a first predicted answer corresponding to the sample question using the machine reading comprehension model, and calculating a first loss between the first predicted answer and the sample answer corresponding to the sample question; replacing at least a part of the sample question with at least one mask to obtain a mask question, inputting the sample article and the mask question into the machine reading comprehension model, generating a second predicted answer corresponding to the mask question using the machine reading comprehension model, and calculating a second loss between the second predicted answer and the sample answer corresponding to the sample question; and calculating a total loss according to the first loss and the second loss, and updating the machine reading comprehension model so as to minimize the total loss.

Furthermore, as shown in FIG. 7, the machine reading comprehension model training apparatus 700 further includes a network interface 701, an input device 703, a hard disk drive (HDD) 705, and a display device 706.

Each of the ports and each of the devices may be connected to each other via a bus architecture. The processor 702, such as one or more central processing units (CPUs), and the memory 704, such as one or more memory units, may be connected via various circuits. Other circuits such as an external device, a regulator, and a power management circuit may also be connected via the bus architecture. Note that these devices are communicably connected via the bus architecture. The bus architecture includes a power supply bus, a control bus and a status signal bus besides a data bus. The detailed description of the bus architecture is omitted here.

The network interface 701 may be connected to a network (such as the Internet, a LAN or the like), receive data (such as a panoramic image) from the network, and store the received data in the hard disk drive 705.

The input device 703 may receive various commands such as predetermined threshold and its setting information input by a user, and transmit the commands to the processor 702 to be executed. The input device 703 may include a keyboard, pointing devices (such as a mouse or a track ball), a touch board, a touch panel or the like.

The display device 706 may display a result obtained by executing the commands, for example, a training result of the machine reading comprehension model and the like.

The memory 704 stores programs and data required for running an operating system, and data such as intermediate results in calculation processes of the processor 702.

Note that the memory 704 of the embodiments of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which may be used as an external high-speed buffer. The memory 704 of the apparatus or the method is not limited to the described types of memory, and may include any other suitable memory.

In some embodiments, the memory 704 stores executable modules or data structure, their subsets, or their superset, i.e., an operating system (OS) 7041 and an application program 7042.

The operating system 7041 includes various system programs for implementing various essential tasks and processing tasks based on hardware, such as a frame layer, a core library layer, a drive layer and the like. The application program 7042 includes various application programs for implementing various application tasks, such as a browser and the like. A program for realizing the method according to the embodiments of the present disclosure may be included in the application program 7042.

The method according to the above embodiments of the present disclosure may be applied to the processor 702 or may be implemented by the processor 702. The processor 702 may be an integrated circuit chip capable of processing signals. Each step of the above method may be implemented by instructions in a form of integrated logic circuit of hardware in the processor 702 or a form of software. The processor 702 may be a general-purpose processor, a digital signal processor (DSP), an application specific integrated circuit (ASIC), field programmable gate array signals (FPGA) or other programmable logic device (PLD), a discrete gate or transistor logic, discrete hardware components capable of realizing or executing the methods, the steps and the logic blocks of the embodiments of the present disclosure. The general-purpose processor may be a micro-processor, or alternatively, the processor may be any common processor. The steps of the method according to the embodiments of the present disclosure may be realized by a hardware decoding processor, or combination of hardware modules and software modules in a decoding processor. The software modules may be located in a conventional storage medium such as a random access memory (RAM), a flash memory, a read-only memory (ROM), an erasable programmable read-only memory (EPROM), an electrically erasable programmable read-only memory (EEPROM), a register or the like. The storage medium is located in the memory 704, and the processor 702 reads information in the memory 704 and realizes the steps of the above methods in combination with hardware.

Note that the embodiments described herein may be implemented by hardware, software, firmware, intermediate code, microcode or any combination thereof. For hardware implementation, the processor may be realized in one or more application specific integrated circuits (ASIC), digital signal processors (DSP), digital signal processing devices (DSPD), programmable logic devices (PLD), field programmable gate array signals (FPGA), general-purpose processors, controllers, micro-controllers, micro-processors, or other electronic components or their combinations for realizing functions of the present disclosure.

For software implementation, the embodiments of the present disclosure may be realized by executing functional modules (such as processes, functions or the like). Software codes may be stored in a memory and executed by a processor. The memory may be implemented inside or outside the processor.

Preferably, when the computer-readable instructions are executed by the processor 702, the processor 702 is configured to replace all words of the sample question with the mask to obtain a first mask question, and/or replace a part of the words of the sample question with the mask to obtain a second mask question.

Preferably, when the computer-readable instructions are executed by the processor 702, the processor 702 is configured to replace all words except a preset interrogative sentence in the sample question with the mask to obtain the second mask question.

Preferably, the total loss is positively correlated with the first loss, and the total loss is negatively correlated with the second loss.

Preferably, when the computer-readable instructions are executed by the processor 702, the processor 702 is configured to calculate the total loss using a first formula. The first formula is $loss=\alpha_1 \cdot loss_1 - \beta_1 \cdot loss_{2,1}$, in a case where the mask question includes the first mask question, the first formula is $loss=\alpha_2 \cdot loss_1 - \beta_2 \cdot loss_{2,2}$, in a case where the mask question includes the second mask question, and the first formula is $loss=\alpha_3 \cdot loss_1 - \beta_3 \cdot loss_{2,1} - \beta_4 \cdot loss_{2,2}$, in a case where the mask question includes the first mask question and the second mask question. Here, loss represents the total loss, $loss_1$ represents the first loss, $loss_{2,1}$ represents the second loss between the second predicted answer corresponding to the first mask question and the sample answer, $loss_{2,2}$ represents the second loss between the second predicted answer corresponding to the second mask question and the sample answer, and $\alpha_1$, $\beta_1$, $\alpha_2$, $\beta_2$, $\alpha_3$, $\beta_3$ and $\beta_4$ represent preset weights, respectively, and are positive values.

Preferably, when the computer-readable instructions are executed by the processor 702, the processor 702 is further configured to predict an answer with respect to an input article and an input question using the trained machine reading comprehension model.

In another embodiment of the present disclosure, a non-transitory computer-readable recording medium having computer-executable instructions for execution by one or more processors is further provided. The execution of the computer-executable instructions cause the one or more processors to carry out a method for training a machine reading comprehension model. The method includes obtaining a training sample set, the training sample set including a plurality of training samples, and each of the training samples including a sample article, a sample question, and a sample answer corresponding to the sample question; and repeatedly performing a training process using the training sample set until a preset training termination condition is met, so as to obtain a trained machine reading comprehension model. The training process includes inputting the sample article and the sample question into the machine reading comprehension model, generating a first predicted answer corresponding to the sample question using the machine reading comprehension model, and calculating a first loss between the first predicted answer and the sample answer corresponding to the sample question; replacing at least a part of the sample question with at least one mask to obtain a mask question, inputting the sample article and the mask question into the machine reading comprehension model, generating a second predicted answer corresponding to the mask question using the machine reading comprehension model, and calculating a second loss between the second predicted answer and the sample answer corresponding to the sample question; and calculating a total loss according to the first loss and the second loss, and updating the machine reading comprehension model so as to minimize the total loss.

As known by a person skilled in the art, the elements and algorithm steps of the embodiments disclosed herein may be implemented by electronic hardware or a combination of computer software and electronic hardware. Whether these functions are performed by hardware or software depends on the specific application and design constraints of the solution. A person skilled in the art may use different methods for implementing the described functions for each particular application, but such implementation should not be considered to be beyond the scope of the present disclosure.

As clearly understood by a person skilled in the art, for the convenience and brevity of the description, the specific working process of the system, the device and the unit described above may refer to the corresponding process in the above method embodiment, and detailed descriptions thereof are omitted here.

In the embodiments of the present disclosure, it should be understood that the disclosed apparatus and method may be implemented in other manners. For example, the device embodiments described above are merely illustrative. For example, the division of the unit is only a logical function division. In actual implementation, there may be another division manner, for example, units or components may be combined or be integrated into another system, or some features may be ignored or not executed. In addition, the coupling or direct coupling or communication connection described above may be an indirect coupling or communication connection through some interface, device or unit, and may be electrical, mechanical or the like.

The units described as separate components may be or may not be physically separated, and the components displayed as units may be or may not be physical units, that is to say, the units may be located in one place, or may be distributed across network units. Some or all of the units may be selected according to actual needs to achieve the objectives of the embodiments of the present disclosure.

In addition, each functional unit the embodiments of the present disclosure may be integrated into one processing unit, or each unit may exist physically separately, or two or more units may be integrated into one unit.

The functions may be stored in a computer readable storage medium if the functions are implemented in the form of a software functional unit and sold or used as an independent product. Based on such understanding, the technical solution of the present disclosure, which is essential or contributes to the prior art, or a part of the technical solution, may be embodied in the form of a software product, which is stored in a storage medium, including instructions that are used to cause a computer device (which may be a personal computer, a server, or a network device, etc.) to perform all or a part of the steps of the methods described in the embodiments of the present disclosure. The above storage medium includes various media that can store program codes, such as a USB flash drive, a mobile hard disk, a ROM, a RAM, a magnetic disk, or an optical disk.

The present disclosure is not limited to the specifically described embodiments, and various modifications, combinations and replacements may be made without departing from the scope of the present disclosure.

What is claimed is:

1. A method for training a machine reading comprehension model, the method comprising:
obtaining a training sample set, the training sample set including a plurality of training samples, and each of the training samples including a sample article, a sample question, and a sample answer corresponding to the sample question; and
repeatedly performing a training process using the training sample set until a preset training termination condition is met, so as to obtain a trained machine reading comprehension model,
wherein the training process includes
inputting the sample article and the sample question into the machine reading comprehension model, generating a first predicted answer corresponding to the sample question using the machine reading comprehension model, and calculating a first loss between the first predicted answer and the sample answer corresponding to the sample question;
replacing at least a part of the sample question with at least one mask to obtain a mask question, inputting the sample article and the mask question into the machine reading comprehension model, generating a second predicted answer corresponding to the mask question using the machine reading comprehension model, and calculating a second loss between the second predicted answer and the sample answer corresponding to the sample question; and
calculating a total loss according to the first loss and the second loss, and updating the machine reading comprehension model so as to minimize the total loss,
wherein the replacing of at least the part of the sample question with the at least one mask to obtain the mask question includes at least one of
replacing all words of the sample question with the mask to obtain a first mask question; and
replacing a part of the words of the sample question with the mask to obtain a second mask question, and
wherein the replacing of the part of the words of the sample question with the mask to obtain the second mask question includes
replacing all words except a preset interrogative sentence in the sample question with the mask to obtain the second mask question.

2. The method for training a machine reading comprehension model as claimed in claim 1,
wherein the total loss is positively correlated with the first loss, and the total loss is negatively correlated with the second loss.

3. The method for training a machine reading comprehension model as claimed in claim 2,
wherein the calculating of the total loss according to the first loss and the second loss includes
calculating the total loss using a first formula,
the first formula being $loss=\alpha_1 \cdot loss_1 - \beta_1 \cdot loss_{2,1}$, in a case where the mask question includes the first mask question,
the first formula being $loss=\alpha_2 \cdot loss_2 - \beta_2 \cdot loss_{2,2}$, in a case where the mask question includes the second mask question, and the first formula being $loss=\alpha_3 \cdot loss_1 - \beta_3 \cdot loss_{2,1} - \beta_4 \cdot loss_{2,2}$, in a case where the mask question includes the first mask question and the second mask question, where loss represents the total loss, lossi represents the first loss, loss2,1 represents the second loss between the second predicted answer corresponding to the first mask question and the sample answer, $loss_{2,2}$ represents the second loss between the second predicted answer corresponding to the second mask question and the sample answer, and $\beta_1$, $\beta_1$, $\alpha_2$, $\beta_2$, $\alpha_3$, $\beta_3$ and $\beta_4$ represent preset weights, respectively, and are positive values.

4. The method for training a machine reading comprehension model as claimed in claim 1, the method further comprising:

predicting an answer with respect to an input article and an input question using the trained machine reading comprehension model.

5. An apparatus for training a machine reading comprehension model, the apparatus comprising:

a memory storing computer-executable instructions; and one or more processors configured to execute the computer-executable instructions such that the one or more processors are configured to obtain a training sample set, the training sample set including a plurality of training samples, and each of the training samples including a sample article, a sample question, and a sample answer corresponding to the sample question; and repeatedly perform a training process using the training sample set until a preset training termination condition is met, so as to obtain a trained machine reading comprehension model, wherein the training process includes inputting the sample article and the sample question into the machine reading comprehension model, generating a first predicted answer corresponding to the sample question using the machine reading comprehension model, and calculating a first loss between the first predicted answer and the sample answer corresponding to the sample question;

replacing at least a part of the sample question with at least one mask to obtain a mask question, inputting the sample article and the mask question into the machine reading comprehension model, generating a second predicted answer corresponding to the mask question using the machine reading comprehension model, and calculating a second loss between the second predicted answer and the sample answer corresponding to the sample question; and calculating a total loss according to the first loss and the second loss, and updating the machine reading comprehension model so as to minimize the total loss, wherein the replacing of at least the part of the sample question with the at least one mask to obtain the mask question includes at least one of replacing all words of the sample question with the mask to obtain a first mask question; and replacing a part of the words of the sample question with the mask to obtain a second mask question, wherein the one or more processors are configured to replace all words except a preset interrogative sentence in the sample question with the mask to obtain the second mask question.

6. The apparatus for training a machine reading comprehension model as claimed in claim 5, wherein the total loss is positively correlated with the first loss, and the total loss is negatively correlated with the second loss.

7. The apparatus for training a machine reading comprehension model as claimed in claim 6, wherein the one or more processors are configured to calculate the total loss using a first formula, the first formula being $loss=\alpha_1 \cdot loss_1 - \beta_1 \cdot loss_{2,1}$, in a case where the mask question includes the first mask question, the first formula being $loss=\alpha_2 \cdot loss_1 - \beta_2 \cdot loss_{2,2}$, in a case where the mask question includes the second mask question, and the first formula being $loss=\alpha_3 \cdot loss_1 - \beta_3 \cdot loss_{2,1} - \beta_4 \cdot loss_{2,2}$, in a case where the mask question includes the first mask question and the second mask question, where loss represents the total loss, lossi represents the first loss, loss2,1 represents the second loss between the second predicted answer corresponding to the first mask question and the sample answer, $loss_{2,2}$ represents the second loss between the second predicted answer corresponding to the second mask question and the sample answer, and $\alpha_1$, $\beta_1$, $\alpha_2$, $\beta_2$, $\alpha_3$, $\beta_3$ and $\beta_4$ represent preset weights, respectively, and are positive values.

8. The apparatus for training a machine reading comprehension model as claimed in claim 5, wherein the one or more processors are further configured to predict an answer with respect to an input article and an input question using the trained machine reading comprehension model.

9. A non-transitory computer-readable recording medium having computer-executable instructions for execution by one or more processors, wherein, the computer-executable instructions, when executed, cause the one or more processors to carry out a method for training a machine reading comprehension model, the method comprising:

obtaining a training sample set, the training sample set including a plurality of training samples, and each of the training samples including a sample article, a sample question, and a sample answer corresponding to the sample question; and repeatedly performing a training process using the training sample set until a preset training termination condition is met, so as to obtain a trained machine reading comprehension model, wherein the training process includes inputting the sample article and the sample question into the machine reading comprehension model, generating a first predicted answer corresponding to the sample question using the machine reading comprehension model, and calculating a first loss between the first predicted answer and the sample answer corresponding to the sample question;

replacing at least a part of the sample question with at least one mask to obtain a mask question, inputting the sample article and the mask question into the machine reading comprehension model, generating a second predicted answer corresponding to the mask question using the machine reading comprehension model, and calculating a second loss between the second predicted answer and the sample answer corresponding to the sample question; and calculating a total loss according to the first loss and the second loss, and updating the machine reading comprehension model so as to minimize the total loss, wherein the replacing of at least the part of the sample question with the at least one mask to obtain the mask question includes at least one of replacing all words of the sample question with the mask to obtain a first mask question; and replacing a part of the words of the sample question with the mask to obtain a second mask question wherein the replacing of the part of the words of the sample question with the mask to obtain the second mask question includes replacing all words except a preset interrogative sentence in the sample question with the mask to obtain the second mask question.

10. The non-transitory computer-readable recording medium as claimed in claim 9, wherein the total loss is positively correlated with the first loss, and the total loss is negatively correlated with the second loss.

11. The non-transitory computer-readable recording medium as claimed in claim 10, wherein the calculating of the total loss according to the first loss and the second loss includes calculating the total loss using a first formula, the first formula being $loss=\alpha_1 \cdot loss_1 - \beta_1 \cdot loss_{2,1}$, in a case where the mask question includes the first mask question, the first formula being $loss=\alpha_2 \cdot loss_1 - \beta_2 \cdot loss_{2,2}$, in a case where the mask question includes the second mask question, and the first formula being $loss=\alpha_3 \cdot loss_1 - \beta_3 \cdot loss_{2,1} - \beta_4 \cdot loss_{2,2}$, in a case where the mask question includes the first mask question and the second mask question, where loss represents the total loss, lossi represents the first loss, $loss2,1$ represents the second loss between the second predicted answer corresponding to the first mask question and the sample answer, $loss_{2,2}$ represents the second loss between the second predicted answer corresponding to the second mask question and the sample answer, and $\alpha_1$, $\beta_1$, $\alpha_2$, $\beta_2$, $\alpha_3$, $\beta_3$ and $\beta_4$ represent preset weights, respectively, and are positive values.

12. The non-transitory computer-readable recording medium as claimed in claim 9, the method further comprising:

predicting an answer with respect to an input article and an input question using the trained machine reading comprehension model.

\* \* \* \* \*